United States Patent [19]

Mandrin

[11] 4,123,508
[45] Oct. 31, 1978

[54] APPARATUS AND METHOD FOR MANUFACTURING DEUTERIUM ENRICHED WATER

[75] Inventor: Charles Mandrin, Winterthur, Switzerland

[73] Assignee: Sulzer Brothers Limited, Winterthur, Switzerland

[21] Appl. No.: 725,148

[22] Filed: Sep. 20, 1976

[30] Foreign Application Priority Data

Sep. 22, 1975 [CH] Switzerland .................. 12269/75

[51] Int. Cl.² .............................................. C01B 5/00
[52] U.S. Cl. ................................... 423/580; 422/159; 422/211; 422/256
[58] Field of Search .................. 423/580 H, 648 A; 23/260, 288 R

[56] References Cited

U.S. PATENT DOCUMENTS

| 2,908,554 | 10/1959 | Hoogschagen | 423/580 H |
| 4,038,035 | 7/1977 | Ergenc et al. | 423/648 A |

FOREIGN PATENT DOCUMENTS

| 222,667 | 7/1959 | Australia | 423/580 H |
| 2,211,105 | 9/1973 | Fed. Rep. of Germany | 423/580 H |
| 903,257 | 12/1958 | United Kingdom | 423/580 H |
| 903,367 | 3/1960 | United Kingdom | 423/580 H |

Primary Examiner—O. R. Vertiz
Assistant Examiner—Wayne A. Langel
Attorney, Agent, or Firm—Kenyon & Kenyon, Reilly, Carr & Chapin

[57] ABSTRACT

Deuterium-enriched water is manufactured for use as the raw material of a heavy water manufacturing plant. The enriched water is manufactured by supplying a flow of deuterium-enriched steam to a catalytic production plant in which hydrocarbons are dissociated in the presence of steam while effecting a deuterium isotope exchange between the hydrogen and steam. The mixture flowing from the plant is passed to a condensor which condenses out deuterium-enriched water for use as the raw material in a heavy water plant. This water is also used to enrich the steam passed into the catalytic production plant for the hydrogen. The mixture is also passed onto an exchange stage to enrich a further supply of water before exhaustion of the hydrogen gas to further processing plants. This additional enriched water is also used to enrich the steam.

13 Claims, 1 Drawing Figure

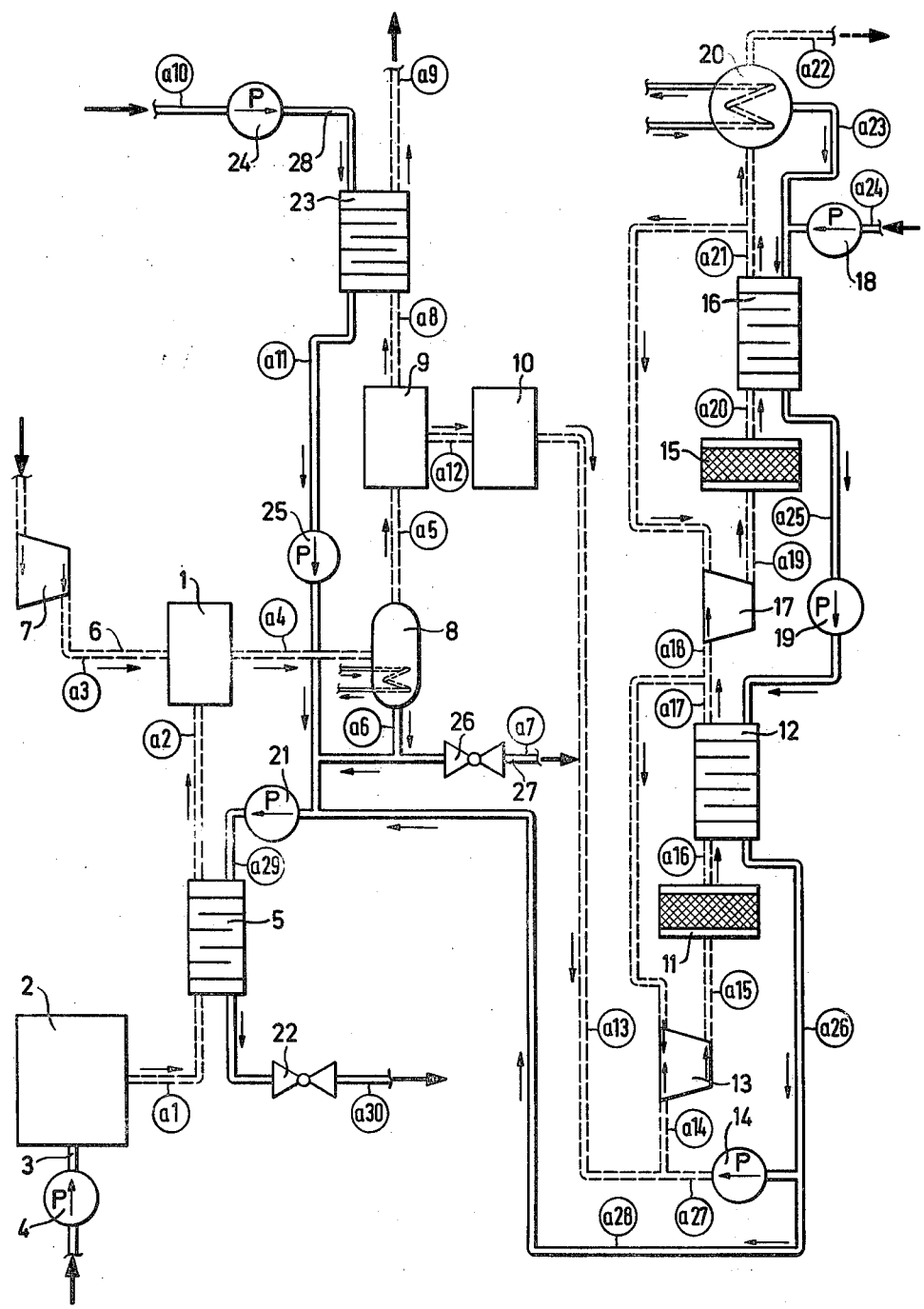

APPARATUS AND METHOD FOR MANUFACTURING DEUTERIUM ENRICHED WATER

This invention relates to an apparatus and method for manufacturing deuterium enriched water.

As is known, many plants which produce heavy water have relied on water with a natural deuterium concentration as the raw material. However, this requires equipment of relatively large capacity as well as correspondingly large energy requirements and cost to handle the inflow of water and to produce the resultant heavy water product. It has also been known that hydrogen can be produced by the catalytic or thermal dissociation of hydrocarbons in the presence of steam. In such cases, considerable amounts of hydrogen, water and steam are generally generated.

Accordingly, it is an object of the invention to use deuterium-enriched water as the raw material of a heavy water plant.

It is another object of the invention to reduce the size of the equipment necessary in a heavy water plant to produce heavy water.

It is another object of the invention to produce deuterium enriched water in a simple economic manner.

It is another object of the invention to produce hydrogen and deuterium-enriched water simultaneously in an economic manner.

The invention is based on the discovery that deuterium-enriched water can be obtained through a modification of the known methods for the production of hydrogen with a relatively small expenditure of energy and equipment, as compared with a catalytic or thermal dissociation installation for the production of hydrogen or for a synthetic gas mixture consisting of hydrogen and nitrogen.

Briefly, the invention provides an apparatus and method for manufacturing deuterium-enriched water while at the same time obtaining hydrogen or a mixture of hydrogen and nitrogen.

The apparatus comprises a hydrogen generator such as a catalytic production plant for generating hydrogen, a high pressure steam generator for generating a flow of steam which is connected to the hydrogen generator to deliver a flow of steam thereto and at least one exchange column disposed between the steam generator and hydrogen generator in the path of steam flow. In addition, the apparatus includes a condensor which is connected to the hydrogen generator to receive an outflow mixture of hydrogen, steam and, in some cases, nitrogen for condensing deuterium-enriched water from the mixture. Also, the apparatus includes at least one exchange stage which is connected to the condensor downstream of the hydrogen generator and which includes a separating means having a catalyst for an isotope exchange between hydrogen and steam and an exchange column for an isotope exchange between a flow of steam from the separating means and a flow of water taken from a suitable water source.

The apparatus may also include a carbon dioxide separator between the condensor and exchange stage for separating out carbon dioxide from the outflow mixture of the hydrogen generator. The outflow of steam and carbon dioxide may also be placed in isotope exchange with a further flow of fresh water in order to enrich the flow of water with any deuterium in the steam.

The method includes the steps of passing a flow of heated steam into isotope exchange with a stream of deuterium enriched water to enrich the steam, thereafter passing the steam into a hydrogen generator while dissociating hydrocarbons in the presence of steam in the hydrogen generator to produce a flow containing at least hydrogen and steam and then condensing deuterium-enriched water from the flow of hydrogen and steam. A portion of this enriched water is then supplied as a first part of the water for enriching the flow of steam to the hydrogen generator. The flow from the hydrogen generator is also passed from the hydrogen generator through the condensor to at least one exchange stage in counterflow to a flow of water in the presence of a catalyst to enrich the flow of water with deuterium. The hydrogen is exhausted from the exchange stage, for example, to a hydrogen user, while the deuterium enriched water is passed as a second part for enriching the flow of heated steam to the hydrogen generator. The deuterium concentration of this second part is between the natural deuterium concentration and the deuterium concentration of the flow from the condensor.

The water remaining in the condenser is used as the raw material for a plant for manufacturing heavy water.

Thus, the method provides not only a process for generating deuterium-enriched water but also a process for generating hydrogen.

These and other objects and advantages of the invention will become more apparent from the following detailed description and appended claims taken in conjunction with the accompanying drawing in which:

The drawing illustrates a schematic of a thermal production plant for hydrogen coupled with a system for the production of deuterium-enriched water in accordance with the invention.

In the embodiment example, a synthetic gas mixture consisting of hydrogen and nitrogen is to be generated for the production of ammonia in a synthesizer plant (not shown).

As shown, the system includes a hydrogen generator, such as a catalytic production plant 1, for generating hydrogen or hydrogen and nitrogen, respectively, which is of known construction and commonly found in practice and is therefore shown only schematically. This plant consists essentially of a primary reformer, in which a catalyst, e.g. nickel oxide is contained and to which heated high-pressure steam and hydrocarbon, e.g. methane, are fed; a so-called secondary reformer, into which air is fed; and a converter, in which a chemical reaction takes place which is represented by the relation $CO + H_2O \rightarrow CO_2 + H_2$ (cf. the German Pat. No. 2,211,105). In addition, a high pressure steam generator such as a steam power generating station 2 is connected to the plant 1 to deliver a flow of high-pressure steam of about 40 bar to the plant. Fresh water is fed to the station 2 by means of a pump 4 via a line 3. The station 2 contains at least one back-pressure type turbine (not shown). The high-pressure steam is enriched with deuterium by flowing in counterflow to into deuterium-enriched water in an isotope exchange column 5 and fed into the primary reformer (not shown) of the hydrogen production plant 1. A hydrocarbon, e.g. methane which has been brought to the operating pressure of the plant 1 in a compressor 7, is also fed-in via a line 6 from a suitable means.

The mixture leaving the plant 1 consists essentially of hydrogen, steam, carbon dioxide and nitrogen. This mixture is conducted to a condensor 8 in which deuterium-enriched water is separated from the mixture. The resultant mixture, which contains essentially hydrogen, nitrogen, carbon dioxide and traces of steam and carbon monoxide is fed to a carbon dioxide separator 9 of known design (cf. for instance, Chemical Engineering Progress, Vol. 70, No. 2, February 1974, p. 57, FIG. 4).

Subsequently, the mixture is fed to a methanator 10 of conventional construction in which chemical reactions take place which are represented by the relations $CO + 3H_2 \rightarrow CH_4 + H_2O$ and $CO_2 + 4H_2 \rightarrow CH_4 + 2H_2O$.

The mixture which consists essentially of hydrogen, steam and traces of methane, in which the hydrogen and the steam are enriched with deuterium beyond the natural deuterium concentration, is fed from the condensor 8 via the separator 9 and methanator 10 to a first exchange stage. This exchange stage consists essentially of a separating stage 11, which has a catalyst consisting of platinum or nickel, and an exchange column 12. As is known, the catalyst is one which is sufficient to permit the enrichment of steam which deuterium while depleting deuterium from hydrogen. As shown, the exchange stage includes a compressor 13 which receives the mixture and compresses the same for passage into the separating stage 11. An isotope exchange between hydrogen and steam takes place in the separating stage 11 wherein the steam is enriched with deuterium and the hydrogen is depleted of deuterium. The mixture pumped into the separating stage 11 by the compressor 13 consists on the one hand of the mixture stream which leaves the methanator 10 and a portion of a deuterium-enriched water stream taken from the exchange column 12 and fed via a pump 14, where the water stream evaporates due to the latent heat of the mixture stream. Depending on the construction of the overall process, it may also be necessary to cool the mixture stream or to heat the stream by means of an external heat source. With conventional catalysts such as, for instance, platinum or nickel, it is necessary to heat the mixture entering the separating stage 11 so that the steam is superheated. This precludes any attack on the catalyst by water droplets which may otherwise render the catalyst inactive. The compression heat of the compressor 13 can be used, for instance for heating the mixture. Should this heat be insufficient, an external heat source is provided for the required heating of the mixture.

The separating stage 11 supplies a flow of steam and hydrogen to the exchange column where an isotope exchange takes place between the steam leaving the separating stage 11 and water coming in counterflow from an additional water source. In this way, the water is enriched with deuterium and the steam is depleted of deuterium. The hydrogen of the mixture does not participate in the isotope exchange in this exchange column 12.

Further, a portion of the gas or vapor mixture leaving the exchange column 12 is fed into the separating stage 11, likewise by means of the compressor 13. This recirculation is performed in order to bring a sufficiently large quantity of steam into contact in the separating stage 11 with the hydrogen and to achieve maximum deuterium enrichment of the steam. A second exchange stage, which consists of a separating stage 15 and an exchange column 16, is also arranged in the system in series with the first exchange stage. This exchange stage also has a compressor 17 for transporting the mixture to the separating stage 15. The exchange process in the separating stage 15 and in the exchange column 16 proceed in the same manner as in the first exchange stage.

Depending on the control of the process, it may be advantageous to arrange a greater number of such exchange stages in series in the system.

In the embodiment example, water of natural deuterium concentration from an additional water source (not shown) after being brought to the process pressure governed by the hydrogen generating plant 1 in a pump 18, is fed into the exchange column 16 and is enriched there with deuterium. The enriched water is then pumped by means of a pump 19 into the exchange column 12 of the first exchange stage. The mixture which leaves the column 16 and consists of deuterium-depleted hydrogen, steam and traces of methane is passed through a condensor 20 where deuterium-depleted steam is condensed and then returned to the exchange column 16. The remaining synthesized gas mixture is then fed to an ammonia synthesis plant (not shown) via a suitable conduit.

The water which was enriched with deuterium in the exchange stages, is fed into the exchange column 5, after a portion had been separated for the separating stage 11 of the first exchange stage. In addition, a portion of the deuterium-enriched water which was liquified in the condensor 8 is passed into the exchange column 5. Also, water originating in a further water source is brought into an isotope exchange in an exchange column 23 with steam taken from the carbon dioxide separator 9 and enriched with deuterium. This third water flow is also fed into the exchange column 5. The three flows of enriched water enter into an isotope exchange in the exchange column 5 with the high-pressure steam fed to the hydrogen generating plant 1 and are depleted of deuterium to at least the approximate natural deuterium concentration. The water is removed from the system, having been expanded in a valve 22 to approximately atmospheric pressure.

The third flow of water passed through the exchange column 23 is conducted via pumps 24, 25 which serve to bring the water to the process pressures which prevail in the exchange columns 23 and 5 and are governed by the hydrogen generating plant 1, and also, to compensate for the pressure losses in the piping. As shown, the steam from the separator 9 after being depleted of deuterium in the exchange column 23 is exhausted from the system. The deuterium-enriched water in the condensor 8 can be drawn off and expanded in a control valve 26 to a suitable pressure for use as the raw material of a heavy water production plant which is constructed advantageously as a monothermic system. The output of the heavy water production plant can be improved substantially over that of a plant into which water with natural deuterium concentration is fed and, conversely, if a given output of heavy water is required, such a plant becomes less expensive as far as equipment is concerned, and considerably less energy is required.

As mentioned above, the heavy water production plant is rendered substantially more economical due to the production of deuterium-enriched water than would be the case if water with natural deuterium concentration were used as the raw material. The system elements which are additionally required in a system for generating hydrogen to enrich the water which serves as the raw material for the production of heavy water add only inappreciably to the load of the hydrogen generating plant equipment-wise and energy-wise. Thus, this enriched water can be obtained almost in a parasitic manner.

Because of the coupling of a system for manufacturing deuterium-enriched water to a system for producing hydrogen, the hydrogen generating plant also becomes more economical, as deuterium-enriched water is obtained as a byproduct.

In the following, some calculated values for a process than can be carried out with the illustrated system are given in a numerical example.

Here, for the point a1 to a30 of the system temperatures are given in ° C.; pressures in bar; throughputs in kmol/h; deuterium concentrations $c$ in ppm; and separation factors $\alpha$.

| | | | Throughput in kmol/h $H_2$ | | | | Deuterium Concentration (c) in ppm | | | | |
|---|---|---|---|---|---|---|---|---|---|---|---|
| | T °C | P bar | $H_2$ | $H_2O$ Steam | $H_2O$ Liquid | $CH_4$ | $H_2$ | $H_2O$ Steam | $H_2O$ Liquid | $CH_4$ | $\alpha$ $H_2O/H_2$ |
| a1 | 360 | 40 | — | 4868 | — | — | — | 146 | — | — | — |
| a2 | 251 | 40 | — | 5039 | — | — | — | 293 | — | — | — |
| a3 | 80 | 38 | — | — | — | 2215 | — | — | — | 146 | — |
| a4 | 118 | 32 | 4136 | 257 | 2861 | — | 182 | 333 | 333 | — | 1.84 |
| a5 | 118 | 32 | 4136 | 257 | — | — | 182 | 333 | — | — | — |
| a6 | 118 | 32 | — | — | 2861 | — | — | — | 333 | — | — |
| a7 | 118 | 12 | — | — | 1000 | — | — | — | 333 | — | — |
| a8 | 45 | 1 | — | 182 | — | — | — | 333 | — | — | — |
| a9 | 45 | 1 | — | 182 | — | — | — | 155 | — | — | — |
| a10 | 45 | 1 | — | — | 201 | — | — | — | 146 | — | — |
| a11 | 47 | 1 | — | — | 201 | — | — | — | 308 | — | — |
| a12 | 74 | 32 | 4136 | 75 | — | — | 182 | 333 | — | — | — |
| a13 | 362 | 30 | 4069 | 142 | — | — | 182 | 283 | — | — | 1.56 |
| a14 | 115 | 30 | 4069 | 324 | — | — | 182 | 289 | — | — | — |
| a15 | 126 | 30.2 | 32001 | 2547 | — | — | 138 | 236 | — | — | 2.43 |
| a16 | 126 | 30.1 | 32001 | 2547 | — | — | 131 | 318 | — | — | — |
| a17 | 115 | 30 | 32001 | 2547 | — | — | 131 | 229 | — | — | — |
| a18 | 115 | 30 | 4069 | 324 | — | — | 131 | 229 | — | — | — |
| a19 | 126 | 30.2 | 32001 | 2547 | — | — | 99 | 173 | — | — | — |
| a20 | 126 | 30.1 | 32001 | 2547 | — | — | 95 | 229 | — | — | 2.43 |
| a21 | 115 | 30 | 32001 | 2588 | — | — | 95 | 165 | — | — | — |
| a22 | 29 | 30 | 4069 | 7 | — | — | 95 | 165 | — | — | — |
| a23 | 29 | 30 | — | — | 358 | — | — | — | 165 | — | — |
| a24 | 29 | 1 | — | — | 2385 | — | — | — | 146 | — | — |
| a25 | 115 | 30 | — | — | 2701 | — | — | — | 210 | — | — |
| a26 | 115 | 30 | — | — | 2701 | — | — | — | 294 | — | — |
| a27 | 115 | 30 | — | — | 182 | — | — | — | 294 | — | — |
| a28 | 115 | 30 | — | — | 2519 | — | — | — | 294 | — | — |
| a29 | 200 | 41 | — | — | 4509 | — | — | — | 309 | — | — |
| a30 | 25 | 2 | — | — | 4410 | — | — | — | 150 | — | — |

The separation factor $\alpha$ for the exchange $H_2O$ steam/$H_2O$ liquid is 1 at (T = 1000° C).

What is claimed is:

1. An apparatus for manufacturing deuterium-enriched water comprising
   a hydrogen generator for generating hydrogen;
   a high pressure steam generator for generating a flow of steam, said steam generator being connected to said hydrogen generator to deliver a flow of steam thereto;
   at least one isotope exchange column disposed between said steam generator and said hydrogen generator in the path of the steam flow;
   a condensor connected to said hydrogen generator to receive an outflow mixture of hydrogen, steam and nitrogen therefrom for condensing deuterium-enriched water from said mixture; and
   at least one exchange stage connected to said condensor downstream of said hydrogen generator relative to a flow of steam and hydrogen from said condensor, said exchange stage including a separating means for a deuterium isotope exchange between hydrogen and steam and an exchange column for an isotope exchange between a flow of steam from said separating means and a flow of water taken from a water source.

2. An apparatus as set forth in claim 1 which further comprises a conduit connected to and downstream of said exchange column relative to the flow of steam and hydrogen for drawing off a synthetic gas mixture for the synthesis of ammonia.

3. An apparatus as set forth in claim 1 which further comprises a monothermic means for manufacturing heavy water connected to a discharge point of said condensor to receive deuterium-enriched water therefrom.

4. An apparatus as set forth in claim 1 which further comprises a carbon dioxide separator between said condensor and said exchange stage for separating out carbon dioxide from said outflow mixture.

5. A system comprising
   a steam generator for generating a flow of steam;
   a catalytic production plant for receiving the flow of steam from said steam generator and a hydrocarbon from a hydrocarbon source to produce an outflow of at least hydrogen and steam;
   a counterflow isotope exchange column between said generator and said plant for enriching the flow of steam to said plant with deuterium from a flow of deuterium-enriched water;
   a condensor connected to said plant to receive said outflow therefrom and to condense deuterium-enriched water from said outflow, said condensor being connected to said exchange column to deliver a flow of deuterium-enriched water thereto; and
   at least one exchange stage connected to said condensor downstream of said plant to receive a flow of steam and hydrogen from said condensor, said exchange stage including a separating means having a catalyst sufficient to permit the enrichment of steam with deuterium from the hydrogen flow from the condensor and an exchange column for an isotope exchange between a flow of steam from said separating means and a flow of water taken from a water source.

6. A system as set forth in claim 5 which further includes an outlet line connected to said condensor for delivering a flow of deuterium-enriched water to a plant for manufacturing heavy water and a control valve in said line for controlling the flow of deuterium-enriched water therein.

7. A system as set forth in claim 5 wherein said catalytic production plant produces an outflow of hydrogen, nitrogen and steam and wherein said system further comprises a carbon dioxide separating means between said condensor and said exchange stage for separating carbon dioxide from said outflow, and said exchange stage includes an outlet line connected to said exchange column therein for exhausting a gas mixture of nitrogen and hydrogen therefrom.

8. A system as set forth in claim 7 which further comprises a condensor in said outlet line of said exchange stage for condensing water from the gas mixture, said latter condensor being connected to said exchange column of said exchange stage to deliver the condensed water in counterflow with the flow of steam from said separating means.

9. A method of manufacturing deuterium-enriched water comprising the steps of passing a flow of heated steam into isotope exchange with a stream of deuterium-enriched water to enrich the steam with deuterium;

thereafter passing the flow of deuterium-enriched steam into a hydrogen generator;

dissociating hydrocarbons in the presence of the steam in the hydrogen generator to produce a flow containing at least deuterium-enriched hydrogen and steam;

thereafter condensing deuterium-enriched water from the flow of deuterium-enriched hydrogen and steam in a condensor downstream of the hydrogen generator while emitting a vaporized mixture of deuterium-enriched hydrogen and steam;

supplying a portion of the deuterium-enriched water in the condensor as a first part of said stream for enriching said flow of heated steam;

feeding the non-condensed mixture in the condensor to at least one exchange stage consisting of a separating means with a catalyst sufficient to perform an enrichment of the steam component of said mixture with deuterium while depleting deuterium from the hydrogen component of said mixture and subsequently passing said mixture into an exchange column for deuterium exchange in counterflow to a flow of water to enrich said flow of water in deuterium while depleting the deuterium from said steam component;

exhausting the hydrogen from the exchange stage while passing the deuterium-enriched water as a second part of said stream for enriching said flow of heated steam; and supplying a remainder of the deuterium-enriched water in the condensor as a raw material to a plant for manufacturing heavy water.

10. A method as set forth in claim 9 wherein the deuterium-enriched water from the exchange stage has a deuterium concentration between a natural concentration and the deuterium concentration of the deuterium-enriched water in the condensor.

11. A method as set forth in claim 9 wherein the exchange stage includes a separating means and an exchange column connected in series relative to the flow of hydrogen and which further comprises the step of recirculating a portion of the mixture leaving the exchange stage to the separating means.

12. A method as set forth in claim 9 which further comprises the step of condensing water from the flow of hydrogen exhausted from the exchange stage and of passing the water into the flow of water in the exchange stage.

13. A method as set forth in claim 12 wherein the condensed water is passed into the flow of water in an upper part of the exchange stage.

* * * * *

UNITED STATES PATENT AND TRADEMARK OFFICE
CERTIFICATE OF CORRECTION

PATENT NO. : 4,123,508
DATED : October 31, 1978
INVENTOR(S) : Charles Mandrin

It is certified that error appears in the above-identified patent and that said Letters Patent are hereby corrected as shown below:

Column 2, line 24, change " condenser" to --condensor--

Column 2, line 60, after "to" delete --into--

Column 5, line 9, change "than" to --that--

Column 5, line 11, change "point" to --points--

Column 5, line 43, change "1000°C" to --100°C--

Signed and Sealed this

Twenty-fourth Day of April 1979

[SEAL]

Attest:

RUTH C. MASON
Attesting Officer

DONALD W. BANNER
Commissioner of Patents and Trademarks